United States Patent [19]

Claus

[11] Patent Number: 4,574,743
[45] Date of Patent: Mar. 11, 1986

[54] HEAT GENERATOR FOR HEATING A FLUID BY HEAT EXCHANGE THROUGH A FLUIDIZED BED AND A PROCESS FOR IMPLEMENTING SAME

[75] Inventor: Guy Claus, St Genis Laval, France
[73] Assignee: Elf France, France
[21] Appl. No.: 578,515
[22] Filed: Feb. 9, 1984
[30] Foreign Application Priority Data
Feb. 21, 1983 [FR] France ................ 83 02773
[51] Int. Cl.[4] ............................................. F22B 1/00
[52] U.S. Cl. ..................... 122/4 D; 165/104.16; 431/7; 431/170
[58] Field of Search .......... 122/4 D; 110/263, 347, 110/245; 431/7, 170; 165/104.16

[56] References Cited

U.S. PATENT DOCUMENTS 4,240,377  12/1980  Johnson .................... 122/4 D
4,454,838  6/1984  Strohmeyer, Jr. ............. 122/4 D Primary Examiner—Edward G. Favors
Attorney, Agent, or Firm—Ostrolenk, Faber, Gerb & Soffen

[57] ABSTRACT

The enclosure of a generator comprises a combustion zone 1 surrounded at least partially by a heat exchange zone 2, the combustion zone comprising a premix chamber 25 having means for supplying with air at 12 and with fuel 10,11 and inert recycling particles coming from zone 2.

The premix chamber has mounted thereover a vertical duct 21 filled with a refractory stack 6 and comprises above the stack an opening 22 serving as overflow communicating with a vertical duct 4 situated outside duct 21 and opening into zone 2. The heat exchange zone 2 is formed as a dense fluidized bed zone and contains fluid circulation tubes 3. The vertical duct 21 serving as combustion hearth is filled with a fixed structure formed by a stack of several layers of spaced parallel bars, offset angularly from one layer to the next.

17 Claims, 3 Drawing Figures

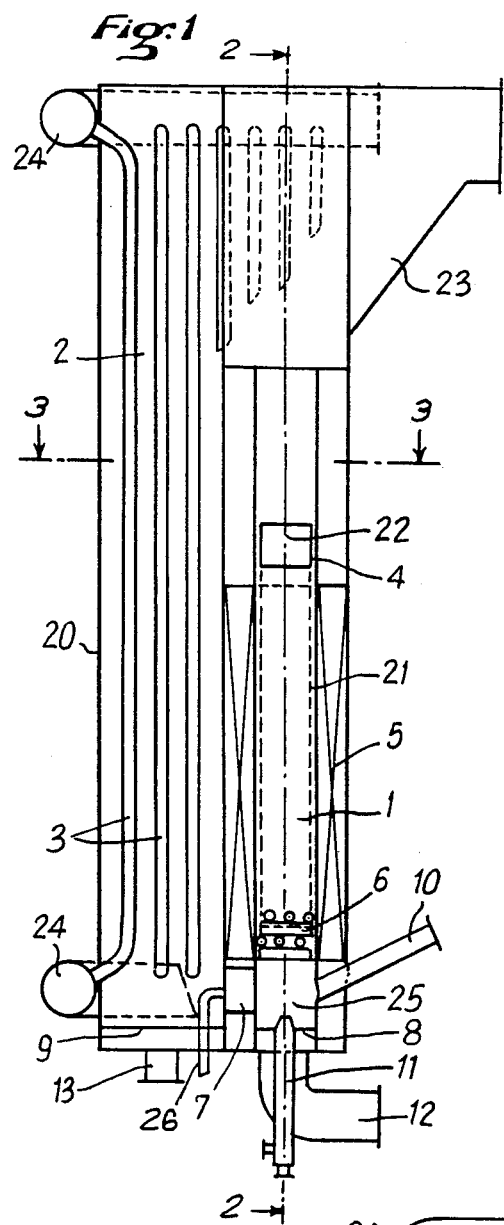
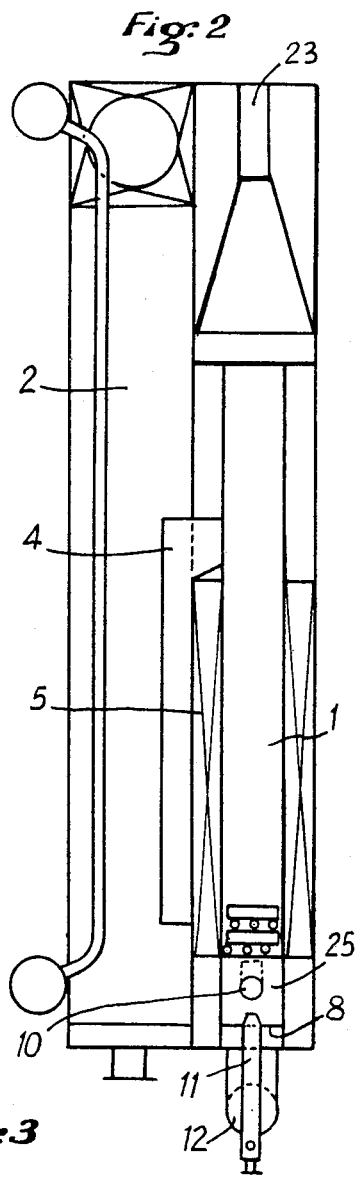
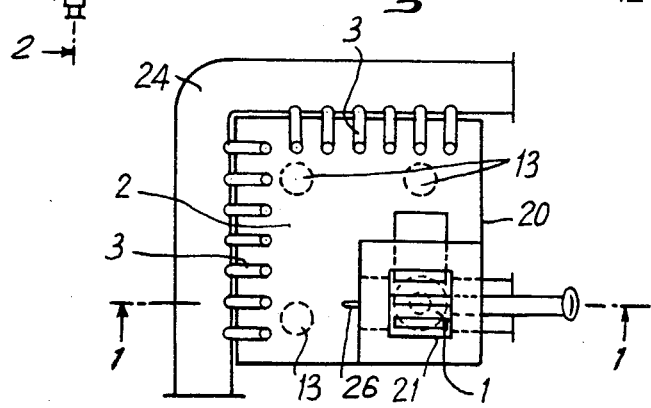

HEAT GENERATOR FOR HEATING A FLUID BY HEAT EXCHANGE THROUGH A FLUIDIZED BED AND A PROCESS FOR IMPLEMENTING SAME

The present invention relates to a heat generator for heating a fluid by thermal exchange through a fluidized bed, as well as a process for using such a generator.

Techniques are already known in which a bank of heat exchange tubes is plunged in a fluidized bed, which is maintained at a high temperature by burning a fuel therein. Such techniques present difficulties inherent in the impossibility of achieving optimum conditions both for the combustion and for the heat exchange.

Circulating bed installations are also known in which the combustion and the transport of fluids takes place in a vertical duct of great length, whereas the heat exchange is effected in a separate exchanger, by means of solids heated during the combustion. Such a technique separating the combustion zone from the exchange zone introduces improvements in so far as the efficiency of the combustion and simplification of the control problems are concerned, but has especially the disadvantage of an installation requiring considerable space.

The aim of the present invention is to overcome the drawbacks mentioned above by providing an installation in which two seaprate zones, the combustion zone and the heat exchange zone, are formed in a single enclosure of reduced size and which offers the possibilities of adequate control of the operating conditions, such as the speed of the gases and the flow rate of the solids between these zones.

The heat generator for heating a fluid by heat exchange through a fluidized bed of inert circulating particles passing through a combustion chamber is characterized in that the enclosure of the generator comprises a combustion zone at least partially surrounded by a heat exchange zone, the combustion zone comprising at its lower part a premix and ignition chamber comprising means for supplying with air, fuel and inert recycling particles coming from the heat exchange zone, said premix chamber having thereover a vertical duct provided with a refractory stack and comprising above the stack, an opening provided in the wall of the duct for overflow of the solids towards the heat exchange zone, which zone is formed as a dense fluidized bed zone having a distribution grid and means for supplying and drawing off the fluidization air and contains tubes for the circulation of fluids in contact with the fluidized bed. The means for supplying the premix chamber with inert recycled particles may be advantageously formed of one or more lateral openings formed in the wall of this chamber and communicating with the lower part of the fluidized heat exchanger zone.

A compressed air injector placed in the vicinity of this opening may assist the passage of particles at this location.

The vertical duct provided with the stack and serving as combustion hearth has preferably thereover a duct for drawing off the combustion gases which may be connected to a cyclone. This drawing off duct is then placed above the overflow opening. The opening in the wall of the vertical duct serving as overflow means may communicate with another vertical duct situated at the outside of the first duct and opening at its lower part into the heat exchange fluidized zone.

The exchanger tubes are preferably placed in the vicinity of the walls of the generator in the heat exchange zone, so as to limit heat losses.

The generator, made from a lagged refractory material may have a rectangular or circular section. The premix chamber and the duct provided with the refractory stack forming the combustion zone will be placed in the generator and the section of this zone may measure from 10 to 20% of the total section of the generator. The walls of the chamber and of the duct will be made from a refractory material used for combustion hearths.

The vertical duct over the premix chamber is filled up to a certain height with a refractory material filling leaving a free passage over an area of at least 50% of the total section of the combustion zone.

For filling, a fixed structure will be preferably used formed by the stack of bars disposed in superimposed layers, the bars of the same layer being parallel to each other and offset angularly with respect to the bars of the adjacent layers. In the case where the angular offset is 90°, the bars of the layers of the same parity are parallel to each other and it is then advantageous to disposed them in a crossed quincunx pattern, i.e. so that in projection in a horizontal plane, the bars of one layer are laterally offset with respect to the bars of the two layers from which they are separated by only a single layer.

As a variant, rings may also be used, generally called "Pall rings", formed from hollow cylindrical elements made from a refractory material in which incomplete cutouts have been formed and bent inwardly, thus forming fins. For starting up the generator, it will comprise a burner fed with liquid or solid fuel opening into the premix chamber, or else electric resistances placed in the wall of the combustion zone may be used.

The invention also relates to a combustion and heat exchange process implemented by means of the generator described, characterized in that the airflows are regulated so as to ensure that the dense fluidized bed of inert particles is maintained in the heat exchange zone and an expanded circulating fluidized bed of inert and combustible particles is maintained in the combustion zone in the form of a suspension whose density may vary from 10 to 50% in volume.

The operation of the generator for satisfying these conditions will be appropriate depending on the use of the installation and on the nature of the fuel and the inert particles. Sand will for example be used, whose grain size varying from 450 to 1250$\mu$ has an average of about 830$\mu$. The fuel may be pulverized coal, heavy fuel or heavy residues.

When the fuel contains sulfur in large amounts, it is advantageous to introduce jointly therewith limestone or dolomite so as to fix the sulfur oxides released by the combustion and thus to control the discharge into the environment.

The airflow blown under the distribution grid of the heat exchange fluidized zone will be sufficient to ensure a minimum fluidization rate, which in the case of the particle size and their mass per unit volume chosen should be at the minimum 0.20 m/s and preferably about 0.4 m/s. This rate will ensure the maintenance of a dense fluidized bed in which the solids occupy about 50% by volume, and will allow good heat exchange in contact with the heat exchange tubes. The air flow blown independently of the first one, into the premix chamber of the combustion zone should ensure a rate ten times higher, i.e. about 4 m/s, so that the fluidized bed in the combustion zone is a relatively aerated bed, formed by a suspension whose density may vary from 10 to 50% by volume, preferably by 30% in volume of solids.

Other features and properties of the installation and the process of the invention will be better understood from the description of one embodiment which follows, with reference to the drawings in which:

FIG. 1 is a longitudinal sectional view along 1—1 of FIG. 3 of the generator;

FIG. 2 is a longitudinal sectional view along 2—2 of FIG. 1; and

FIG. 3 is a cross section through 3—3 of FIG. 1.

In a rectangular section generator, an outside casing 20 encloses two zones, a combustion zone 1 and a heat transfer fluidized zone 2.

The combustion zone is in the form of a vertical chimney 21 with rectangular section placed in a corner of the rectangular section of the generator and provided up to a certain height with a refractory stack 6. The chimney 21 is surrounded on all sides by electric resistances 5 for preheating the generator. In its upper part, the chimney has an overflow orifice 22 which opens into a vertical chute 4 placed inside zone 1, serving for bringing the solids from the combustion hearth back to the lower part of the fluidized zone 2.

Chimney 21 is extended upwards so as to open into a chamber 23 which may possibly open at the inlet of a cyclone.

The hearth of the combustion zone is mounted above a premix chamber 25, which may be lined or not and which is limited towards the bottom by a grid 8 and in which open a solid fuel supply tube 10, and a liquid fuel injection tube 11 placed in the axis inside a combustion air intake tube 12. On one of the sides communicating with zone 2, the mixing chamber 25 is provided with an aperture 7. A pressurized air injector (26) opens in the vicinity of said opening 7 for assisting the passage of inert particles from the heat exchange zone 2 to the premixed chamber at 25. The heat transfer fluidized zone 2 is provided towards the bottom with several fluidization air intakes 13 opening under a diffusion grid 9.

The two sides of walls 20 which are not adjacent the combustion zone 1 are provided with vertical heat exchanger tubes 3 which, connected to the manifolds 24 form a boiler installation. According to one example of operation of the installation described, 100 kg of quartz sand are charged which, because of the air supply at 12, are in a fluidized condition in zone 1. The electric preheating installation 5 is switched on. When the temperature reaches 800° C. in the combustion zone, fluidization is initiated in the dense zone 2 and fifty kilograms of sand are gradually added so as to establish a difference of level between the two fluidized beds of about 20 cm. With this method of operating, the rate of circulation of the sand between the two zones is reduced. Then the water flow is started up in tubes 3 while regulating its flowrate so as not to exceed boiling temperature.

When initiating the fuel supply, the electric heating power is gradually reduced while maintaining the temperature of the hearth at about 850° C. The electric heating is finally switched off when a temperature of 335° C. is reached in the dense bed and the fuel flowrate is maintained at its maximum value.

Under stabilized running conditions of the generator, the combustion zone is supplied with heavy fuel at a rate of 6.4 kg/hour and an excess of air of about 20%. The power released is then of the order of 62 thermal units/hour. The installation is filled with sand, whose flowrate between the combustion zone 1 and the fluidized zone 2 is about 300 kg/hour. The temperature of the hearth is about 850° C., whereas that of the dense bed is about 335° C.

The flowrate of the water entering through tubes 3 at 60° and leaving to one of the manifolds 24 at 80° C. is 17 m³/hour.

It can be seen that the performances obtained with heat transfer provided by means of the installation of the invention are very advantageous. The invention is not limited to the embodiment described, it also covers numerous variants and especially those concerning the geometry and dimensions of the heat generator, arrangements of the combustion zone inside the generator, the methods of supplying the fluidized beds with air, fuel and inert particles and the nature of the fuel and of the initial heating for starting up, as well as the methods for controlling the total amount of solids in the installation.

I claim:

1. A heat generator for heating a fluid by heat exchange through a fluidized bed of inert particles which circulate in the same enclosure between a first zone, where they accumulate a part of the heat released by the combustion and a second dense fluidized bed zone (2) having a distribution grid (9) and fluidization air supply means (13) and containing fluid circulation tubes (3) in contact with the fluidized bed, characterized in that the first zone comprises a combustion zone (1) formed by a vertical duct (21) provided with a refractory stack (6) and comprising above the stack an opening (22) formed in the wall of the duct for overflowing the solids towards the dense fluidized bed zone (2), said vertical duct comprising a premix and ignition chamber (25) having means for supplying with air (12), fuel (10,11) and inert recycling particles coming from the dense fluidized bed zone (2).

2. The heat generator according to claim 1, characterized in that the means for supplying the premix chamber (25) with recycled inert particles comprises a lateral opening (7) formed in the wall of this chamber and communicating with the heat exchange fluidized zone (2).

3. The generator according to claim 2, characterized in that a pressurized air injector opens in the vicinity of said opening (7) for assisting the passage of inert particles from the heat exchange zone (2) to the premix chamber (25).

4. The heat generator according to claim 3, characterized in that overflow opening (22) communicates with with a combustion gas drawing off chamber (23) which is connected to a cyclone.

5. The heat generator according to claim 4, characterized in that the opening (22) in the wall of the vertical duct (21) provided with the stack (6) is formed as an overflow, which communicates with the vertical duct (4) situated inside said verticle duct (21) and opening at its lower part into the heat exchange fluidized zone (2).

6. The generator according to claim 5, characterized in that the fluid circulation tubes (3) are placed in the vicinity of the walls (20) of the second dense fluidized bed zone (2).

7. The generator according to claim 6, characterized in that the verticle duct over the premix chamber (25) contains a fixed structure formed by a stack of several layers spaced parallel bars, offset angularly from one layer to the other.

8. The generator according to claim 7, characterized in that the angular offset of the bars forming the filling is 90°, the stack of bars being formed in "a crossed quincunx pattern".

9. The generator according to claim 6, characterized in that the verticle duct over the premix chamber (25) contains annular rings made from refractory steel comprising fins formed by bending towards the inside of the ring cut-outs formed in the material of the ring.

10. The generator according to claim 8, characterized in that, the part of the combustion zone (1) not obstructed by the stack (6), measured across the passage cross section is at least 50% of the total section of this zone.

11. The generator according to claim 10, characterized in that the cross sectional area of the combustion zone (1) represents 10 to 20% of the total area of the cross section of the generator.

12. The generator according to claim 11, characterized in that the generator has a parallelepipedic shape and that the combustion zone, also with a parallelepipedic shape, has one or two walls adjacent the wall of the generator (20), the inner surface of the walls of the gnerator not adjacent the combustion zone being fitted with fluid circulation tubes (3).

13. A combustion and heat exchange process using a heat generator for heating a fluid by heat exchange through a fluidized bed of inert particles which circulate in the same enclosure between a first zone, where they accumulate a part of the heat released by the combustion and a second dense fluidized bed zone (2) having a distribution grid (9) and fluidization air supply means (13) and containing fluid circulation tubes (3) in contact with the fluidized bed, wherein the first zone comprises a combustion zone (1) formed by a vertical duct (21) provided with a refractory stack (6) and comprising above the stack an opening (22) formed in the wall of the duct for overflowing the solids towards the dense fluidized bed zone (2), said vertical duct comprising a premix and ignition chamber (25) having means for supplying with air (12), fuel (10, 11) and inert recycling particles coming from the dense fluidized bed zone (2) characterized in that the airflow rates are regulated so as to ensure the maintenance of a dense fluidized bed of inert particles in the heat exchange zone and an expanded fluidized bed of inert particles and fuel ascending in the combustion zone in the form of suspension whose density may vary between 10 and 50% by volume.

14. The process according to claim 13, characterized in that the blown air rate in the combustion zone is about 10 times greater than that of the air blown into the heat exchange fluidized zone.

15. The process according to claim 13 or 14, characterized in that the passage of inert particles is assisted from the heat exchange zone to the premix chamber by means of an air jet.

16. The combustion and heat exchange process according to claim 13, characterized in that the generator is charged with sand so as to establish a fluidized bed in the combustion zone, this zone is preheated by means of electric heating to a temperature of the order of 800° C., a dense fluidized bed is established in the heat transfer fluidized zone, the combustion zone is supplied with fuel, the electric heating is gradually reduced, the level of the dense fluidized bed is regulated by addition of sand so as to establish a difference of level between the two beds at a value varying from 10 to 25 cm, the electric heating is switched off as soon as a temperature of about 335° C. is reached, the heat exchange tubes are supplied with cooling water and the rate of air blown into the combustion zone is regulated to about 4 m/s and that of the air blown into the zone of the dense bed to about 0.4 m/s.

17. The process according to claim 13, characterized in that limestone, dolomite or any other solid powdery material capable of fixing the sulfur oxides is introduced jointly with the fuel, so as to control the sulfur oxide content of the discharged smoke and fumes.

* * * * *